(12) United States Patent
Huh et al.

(10) Patent No.: US 10,486,996 B2
(45) Date of Patent: Nov. 26, 2019

(54) MIXING APPARATUS FOR CRUSHING SLUDGE

(71) Applicant: Ecolab USA Inc., St. Paul, MN (US)

(72) Inventors: Seung-Nyung Huh, Seoul (KR); Jin Nyung Huh, Gyunggi-Do (KR)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 16/289,746

(22) Filed: Mar. 1, 2019

(65) Prior Publication Data

US 2019/0194051 A1  Jun. 27, 2019

Related U.S. Application Data

(63) Continuation of application No. 15/373,805, filed on Dec. 9, 2016, now Pat. No. 10,227,249, which is a (Continued)

(30) Foreign Application Priority Data

Mar. 30, 2011 (KR) ........................ 10-2011-0028873

(51) Int. Cl.
 *B01F 7/00* (2006.01)
 *B01F 3/08* (2006.01)
 (Continued)

(52) U.S. Cl.
 CPC ............ *C02F 11/14* (2013.01); *B01F 3/0857* (2013.01); *B01F 7/007* (2013.01); *B01F 7/0025* (2013.01);
 (Continued)

(58) Field of Classification Search
 CPC .... B01F 2015/00084; B01F 2015/0011; B01F 2215/0052; B01F 3/0857; B01F 7/0025;
 (Continued)

(56) References Cited

U.S. PATENT DOCUMENTS 332,349 A  12/1885  Knox
684,295 A  10/1901  McLellan
(Continued)

FOREIGN PATENT DOCUMENTS

CA  2800924 A1  12/2011
DE  74618 C  9/1893
(Continued)

OTHER PUBLICATIONS

International Patent Application No. PCT/EP2012/055881, International Search Report and Written Opinion dated Jul. 3, 2012, 11 pages.

*Primary Examiner* — Tony G Soohoo
(74) *Attorney, Agent, or Firm* — Fredrikson & Byron, P.A.

(57) ABSTRACT

A mixing apparatus has a chemical moving part, a motor, a paddle, and a plate. The chemical moving part is configured to receive and output a chemical in a pipe. The motor is configured to rotatably drive a shaft coupled to the motor at a first end of the shaft. The shaft defines a central rotational axis. The paddle is connected to a second end of the shaft and configured to rotate with the shaft. The plate is configured to secure the motor to the pipe and has a first side facing the motor and a second opposite side facing a projection of the paddle. The first side defines a first length extending in a direction perpendicular to the shaft and the second side defines a second length extending in a direction perpendicular to the shaft. The first length is greater than the second length.

20 Claims, 3 Drawing Sheets

Related U.S. Application Data continuation of application No. 13/961,361, filed as application No. PCT/EP2012/055881 on Mar. 30, 2012, now Pat. No. 9,517,959.

(51) Int. Cl.
   *B01F 15/00* (2006.01)
   *C02F 11/14* (2019.01)
   *C02F 1/56* (2006.01)

(52) U.S. Cl.
   CPC ...... *B01F 7/00258* (2013.01); *B01F 7/00908* (2013.01); *B01F 2015/0011* (2013.01); *B01F 2015/00084* (2013.01); *B01F 2215/0052* (2013.01); *C02F 1/56* (2013.01)

(58) Field of Classification Search
   CPC ... B01F 7/00258; B01F 7/007; B01F 7/00908
   See application file for complete search history.

(56) References Cited

U.S. PATENT DOCUMENTS

| | | |
|---|---|---|
| 975,380 A | 11/1910 | Berntson |
| 1,242,445 A | 10/1917 | Ittner |
| 2,103,888 A | 12/1937 | Bowen |
| 2,203,673 A | 6/1940 | Mead |
| 2,404,679 A | 7/1946 | Andron et al. |
| 2,577,095 A | 12/1951 | Walker |
| 2,592,709 A | 4/1952 | Kinnaird |
| 2,928,661 A | 3/1960 | MacLaren |
| 3,400,918 A | 9/1968 | MacLaren |
| 3,482,520 A | 12/1969 | Larsen |
| 3,666,663 A | 5/1972 | Walker |
| 3,774,887 A | 11/1973 | Dunn |
| 3,776,531 A | 12/1973 | Ebner et al. |
| 3,899,159 A | 8/1975 | Nauta |
| 3,913,894 A | 10/1975 | McFarren |
| 3,920,225 A | 11/1975 | Lee |
| 4,168,918 A | 9/1979 | de Jonge |
| 4,215,543 A | 8/1980 | Miller |
| 4,321,818 A | 3/1982 | Bessho |
| 4,511,255 A | 4/1985 | Saucier |
| 4,860,957 A | 8/1989 | Lidstrom |
| 4,944,669 A | 7/1990 | Zakich |
| 4,985,149 A | 1/1991 | Yoshio et al. |
| 5,193,908 A | 3/1993 | Rescorla et al. |
| 5,362,148 A | 11/1994 | Lehrke et al. |
| 5,478,535 A | 12/1995 | Fierz et al. |
| 5,918,978 A | 7/1999 | Schieg |
| 5,993,670 A | 11/1999 | Knauer |
| 6,158,722 A | 12/2000 | Gigas |
| 6,240,758 B1 | 6/2001 | Nagakura |
| 6,345,908 B1 | 2/2002 | Gmeiner |
| 6,350,054 B1 | 2/2002 | Lee et al. |
| 6,402,065 B1 | 6/2002 | Higgins |
| 6,443,612 B1 | 9/2002 | Keller |
| 6,523,992 B1 | 2/2003 | Bublewitz et al. |
| 6,578,780 B2 | 6/2003 | Knauer et al. |
| 7,252,429 B2 | 8/2007 | Yungblut |
| 7,320,541 B2 | 1/2008 | Wagner et al. |
| 7,459,506 B2 | 12/2008 | Gebhart et al. |
| 7,708,824 B2 | 5/2010 | Ogata et al. |
| 8,485,716 B2 | 7/2013 | Handa |
| 8,616,025 B2 | 12/2013 | Yamamoto et al. |
| 8,833,688 B2 | 9/2014 | Koop et al. |
| 8,961,000 B2 | 2/2015 | Singer |
| 9,120,063 B2 | 9/2015 | Knauer |
| 9,289,705 B2 * | 3/2016 | Knauer ............... B01F 7/00125 |
| 9,487,916 B2 * | 11/2016 | Zhao .................... D21H 17/375 |
| 9,517,959 B2 * | 12/2016 | Huh .................... B01F 7/00258 |
| 10,145,067 B2 * | 12/2018 | Zhao .................... D21H 17/375 |
| 10,227,248 B2 * | 3/2019 | Knauer ............... B01F 7/00125 |
| 10,227,249 B2 * | 3/2019 | Huh .................... B01F 7/00258 |
| 2002/0190401 A1 | 12/2002 | Sylvester |
| 2003/0178375 A1 | 9/2003 | Sharpe et al. |
| 2004/0013032 A1 | 1/2004 | Cappellino |
| 2004/0223404 A1 | 11/2004 | Hughes |
| 2005/0286984 A1 | 12/2005 | Weise et al. |
| 2006/0176771 A1 | 8/2006 | Adams |
| 2007/0125894 A1 | 6/2007 | Koop et al. |
| 2012/0180529 A1 | 7/2012 | Singer |
| 2013/0098843 A1 * | 4/2013 | Knauer ............... B01F 7/00125 210/723 |
| 2013/0148466 A1 | 6/2013 | Gramann et al. |
| 2013/0299110 A1 * | 11/2013 | Zhao .................... D21H 17/375 162/164.6 |
| 2014/0042067 A1 * | 2/2014 | Huh .................... B01F 7/00258 210/205 |
| 2015/0197893 A1 | 7/2015 | Cheng et al. |
| 2015/0258510 A1 | 9/2015 | Pich |
| 2015/0367299 A1 | 12/2015 | Knauer |
| 2016/0130167 A1 * | 5/2016 | Knauer ............... B01F 7/00125 210/738 |
| 2017/0158540 A1 * | 6/2017 | Huh .................... B01F 7/00258 |
| 2017/0327392 A1 | 11/2017 | Burnett et al. |
| 2019/0194051 A1 * | 6/2019 | Huh .................... B01F 7/00258 |

FOREIGN PATENT DOCUMENTS

| | | |
|---|---|---|
| DE | 3719441 A1 | 12/1988 |
| DE | 4029824 A1 | 3/1992 |
| DE | 19517381 C1 | 11/1996 |
| DE | 19613679 A1 | 10/1997 |
| DE | 19719638 A1 | 4/1998 |
| DE | 19808156 A1 | 9/1999 |
| DE | 202005000875 U1 | 7/2006 |
| DE | 102005019010 A1 | 10/2006 |
| DE | 102010023793 A1 | 12/2011 |
| EP | 116024 A1 | 8/1984 |
| EP | 1479758 A2 | 11/2004 |
| EP | 1815972 A2 | 8/2007 |
| JP | S62059132 U | 4/1987 |
| JP | H09117654 A | 5/1997 |
| JP | 2002248493 A | 9/2002 |
| JP | 2004130181 A | 4/2004 |
| JP | 2009039683 A | 2/2009 |
| KR | 200447694 Y1 | 2/2010 |
| KR | 101040927 B1 | 6/2011 |
| SU | 1454367 A1 | 1/1989 |
| WO | 2009065509 A1 | 5/2009 |
| WO | 2011157633 A2 | 12/2011 |
| WO | 2012032090 A1 | 3/2012 |
| WO | 2012104384 A1 | 8/2012 |
| WO | 2012131071 A1 | 10/2012 |

* cited by examiner

MIXING APPARATUS FOR CRUSHING SLUDGE

RELATED APPLICATIONS

This application is a continuation of U.S. patent application Ser. No. 15/373,805, filed Dec. 9, 2016, which is a continuation of U.S. patent application Ser. No. 13/961,361, filed Oct. 30, 2013 and now U.S. Pat. No. 9,517,959, which was filed as PCT Application No. PCT/EP2012/055881 on Mar. 30, 2012, which claims the benefit of foreign application KR 10-2011-0028873 filed Mar. 30, 2011.

FIELD OF THE INVENTION

The present invention relates to a mixing apparatus for crushing sludge.

BACKGROUND

In general, in order to remove floating matters contained in waste water and water through coagulation and sedimentation, a chemical (coagulant) is fed into the waste water and the like to cause a coagulation reaction.

Through the coagulation reaction, a flock is formed coagulated by a coagulant such as a particle of an organic matter and a microbe or a suspended material of the waste water and the like. For the flock formation in the precipitation tank, the thickener tank, and the like, the chemical (coagulant) is fed into a pipe or the chemical (coagulant) is fed separately into the precipitation tank, the thickener tank, and the like in general In the case of the abovementioned typical method, raw water (sludge) and the chemical (coagulant) are not agitated appropriately, and the flock is formed insufficiently, which leads to an overfeeding of the chemical during the flock formation.

In the case of a belt press dehydrator for a sludge dehydration process, an agitator of a quadrangular agitation tank at a front rotates at a slow speed to carry out agitation. In this case, sufficient time is not provided for the raw water (sludge) and the chemical (coagulant) to react with each other, and sizes of the formed flocks are irregular and large, hindering an even distribution at the belt press dehydrator.

Also, adequate agitation is unlikely while the flock stays in the agitator, which leads to the overfeeding of the chemical during the dehydration process. Therefore, a filter cloth is clogged, water filtering performance is lowered, and an increase in water content becomes unavoidable.

A centrifugal dehydrator feeds the chemical by connecting a raw water (sludge) pipe leading to the belt press dehydrator with a chemical (coagulant) pipe. A simultaneous feeding into the belt press dehydrator is made, and the flock formation and dehydration is conducted by a turning force of the centrifugal dehydrator. Since the coagulation reaction is carried out in the belt press dehydrator, the reaction is made inadequately before discharge, meaning that the water content is maintained higher than a design value during operation, and operation efficiency of the dehydrator drops due to the flock formation based on the overfeeding of the chemical.

Technical Solution for the Problem

The problem to be solved by the present invention is to provide a new mixing apparatus for crushing sludge, preferably installed at a raw water (sludge) pipe to mix raw water (sludge) with a chemical (coagulant) in a precipitation tank, a thickener tank, a thickener, and a dehydration process at a filtration plant, a waste water disposal plant, etc.

This problem is solved by a mixing apparatus according to claim 1. Advantageous and/or preferred embodiments can be obtained from the dependent claims.

In particular, a mixing apparatus for crushing sludge according to the invention may include a motor part in which a rotary shaft is inserted into the motor part and the motor part is rotated, a moving part formed to penetrate the motor part from one side to another side and move a chemical which is flowed through an outside chemical feeder to the another side, and a paddle mounted on the another side of the motor part to rotate based on the rotation of the motor part and spray the chemical.

The paddle may have a moving hole which the chemical moves inside, a discharge hole connected to the moving hole and discharging the chemical outside, and a saw-toothed part projecting outside.

An inner wall surface of the discharge hole and a corner of the saw-toothed part of the paddle may be formed sharply.

The motor part may include a main body in which the rotary shaft is inserted into the main body, a first plate combined with one side of the main body and one outer circumference of the shaft, and a second plate combined with another side of the main body and another outer circumference of the shaft.

The shaft may have a penetrating path inside to move the chemical fed at one side to another side.

The first plate may include a first bearing part combined with an outer circumference of the shaft, a first sealing part combined to surround the first bearing part, and an inlet part formed in the first sealing part and allowing the chemical fed from outside to flow to a penetrating path of the shaft.

The first sealing part may be a mechanical seal.

The second plate may include a second bearing part combined with an outer circumference of the shaft, a second sealing part combined to surround the second bearing part around an outer circumference of the second bearing part, and a securing part surrounding the second bearing part and the second sealing part, and securing the second bearing part and the second sealing part to the another side of the motor part.

The second sealing part may be a mechanical seal.

The moving part may include an inlet part formed on the first plate and allowing the chemical to flow in, a penetrating path formed in the shaft of the motor part, and a moving hole formed in the paddle.

The mixing apparatus may be installed, in particular vertically, at a raw water (sludge) pipe to mix raw water (sludge) with a chemical (coagulant) in a precipitation tank, a thickener tank, a thickener, and a dehydration process at a filtration plant, a waste water disposal plant, etc.

Effect of the Invention

According to the present invention, dehydrator efficiency is raised and water content of a dehydration cake is lowered since a microbial cell is destroyed by a corner of a saw-toothed part of a rotating paddle while cavitation is induced to remove moisture contained in the microbial cell.

Further, since agitation is conducted by the paddle rotating at a high speed in a narrow pipe, an even and solid flock is made by using a proper amount of chemical (coagulant) so that the chemical (coagulant) is saved compared to a previous chemical (coagulant) feeding method. Sludge sedimentation and thickening efficiency improves, and overall efficiency of water purification and waste water treatment increases.

DETAILED DESCRIPTION FOR CARRYING OUT THE INVENTION

Figure 1:
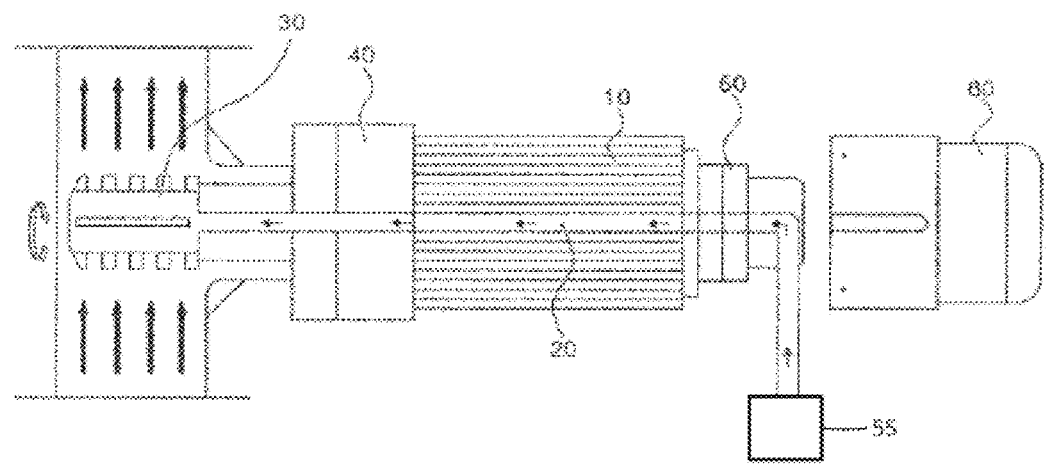
FIG. 1 is a general view of a mixing apparatus for crushing sludge according to the present invention.

Hereinafter, the present invention will be described in detail by explaining preferred embodiments of the invention with reference to the attached drawings. Like reference numerals in the drawings denote like elements. Moreover, detailed descriptions related to well-known functions or configurations will be ruled out in order not to unnecessarily obscure subject matters of the present invention.

Figure 2:
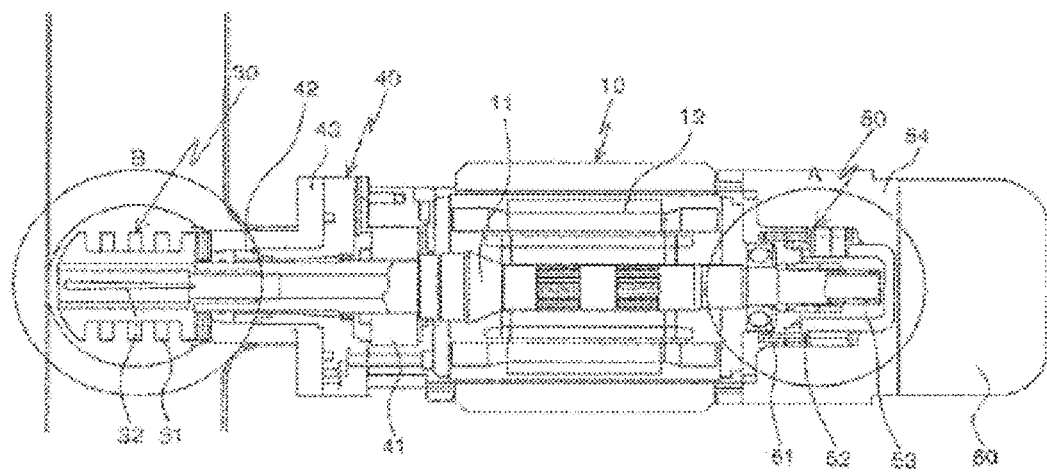
FIG. 2 is a sectional view of the mixing apparatus for crushing sludge according to the present invention.

With reference to FIGS. 1 and 2, a mixing apparatus for crushing sludge of the present invention includes a motor part 10, a moving part moving a chemical, a paddle 30 disposed at another side of the motor part 10 to spray the chemical while rotating, a cooling fan 60 disposed at a side of the motor part 10 to cool the motor part 10.

The motor part 10 includes a shaft 11 inserted into an inside of a main body 11, and first and second plates 40 and 50 coupled with both ends of the shaft 11. The cooling fan 60 is disposed at the side of the motor part 10 to cool the motor part 10.

The moving part includes an inlet part 53, disposed at a first sealing part 52 of the first plate 50 so that the chemical (coagulant) flows in through the inlet part 53, a penetrating path disposed at the shaft 11 of the motor part 10, and a moving hole formed in the paddle 30.

The moving part may form the inlet part 53 at the second plate 40.

The shaft 11 rotates in the main body 11. The penetrating path is formed inside in a length direction, and an inlet hole connected to the penetrating path is formed at one side end outer circumference.

The first plate 50 is coupled with a side of the shaft 11, and the second plate 40 is coupled with another side.

Figure 3:
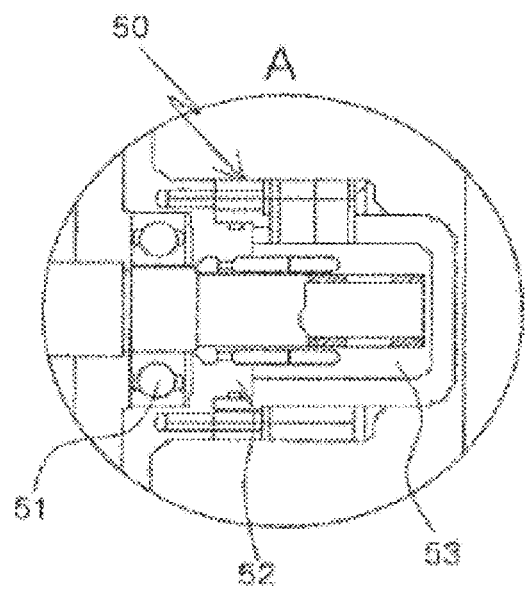
FIG. 3 is an enlarged view showing portion A of FIG. 2.

With reference to FIG. 3, the first plate 50 includes a first bearing part 51 coupled with one outer circumference of the shaft, the first sealing part 52 surrounding and coupled with the first bearing part 51, and the inlet part 53 disposed in the first sealing part 52.

The first bearing part 51 is disposed between the shaft 11 and the first sealing part 52 so that the shaft 11 rotates smoothly.

The first sealing part 52 conducts sealing so that the chemical, which may leak out of the inlet part 53 disposed inside, does not leak out.

The first sealing part 52 may be a mechanical seal.

Here, the first sealing part 52 may be the mechanical seal because there is an automatic control function not to affect sealing performance even when a sealing material is worn out to a certain extent through friction.

In addition, a leap seal, a grand packing, and a leakage seal may be used for the first sealing part 52.

The inlet part 53 disposed in the first sealing part 52 feeds the chemical supplied from an external chemical feeder 55 into the penetrating path through the inlet hole of the shaft 11.

A cover part 54 is disposed at an exterior of the first sealing part 52 to protect the first sealing part 52.

The second plate 40 includes a second bearing part 41 coupled with the other outer circumference of the shaft 11, a second sealing part 42 surrounding and coupled with the second bearing part 41, and a securing part surrounding and fixing the second bearing part 41.

The second bearing part 41 is disposed between the shaft 11 and the second sealing part 42 so that the shaft 11 rotates smoothly.

The second sealing part 42 is coupled with another side of the shaft 11, surrounds and is coupled with the second bearing part 41, and conducts sealing so that the chemical does not leak out of the another side of the shaft 11.

The second sealing part 42 may be the mechanical seal.

Here, the second sealing part 42 may be the mechanical seal because there is the automatic control function, as is the case of the first sealing part 52, not to affect the sealing performance even when the sealing material is worn out to the certain extent through the friction.

In addition, the leap seal, the grand packing, and the leakage seal may be used for the second sealing part 42.

The securing part is coupled with an outer side of the second sealing part 42 to fix the second sealing part 42 at another side of the main body 11.

The paddle 30 is coupled with another side of the second plate 40.

Figure 4:
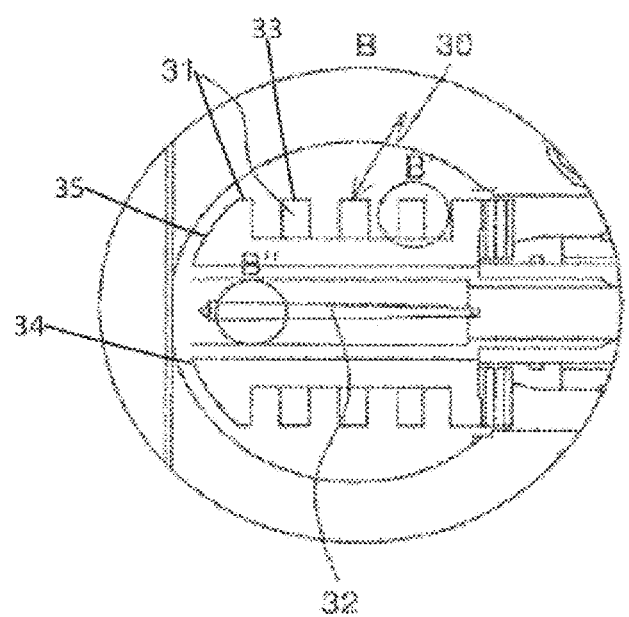
FIG. 4 is an enlarged view showing portion B of FIG. 2.

With reference to FIG. 4, the paddle 30 is connected to another side of the shaft 11. A moving path is disposed in the paddle 30, and the moving path is connected to the penetrating path of the shaft 11 so that the chemical is fed into the paddle 30.

A discharge hole 32 is formed at an outer circumference of the paddle 30 so that the chemical moving through the moving path is discharged.

A plurality of saw-toothed parts, or projections, 31 terminate in an outward edge 33 and are disposed at the outer circumference of the paddle 30 in the length and outside direction to crush the sludge while the paddle 30 is rotating and form a flock by mixing the chemical with the sludge. Paddle 30 is also shown to include distal portion 34 and curved end 35.

The discharge hole 32 and the saw-toothed part 31 have a sharply formed corner because the corner of the discharge hole 32 and the saw-toothed part 31 may crush a microbe in the sludge and increase flock formation while the paddle 30 rotates and increases cavitation. By crushing the microbe hindering coagulation, coagulation efficiency improves and moisture contained in a cell of the microbe is discharged.

Here, the cavitation is defined as creation of a space devoid of water, occurring when a low-pressure zone is formed in a fluid and a gas contained in the water escapes the water to be collected at the low-pressure zone.

According to the present invention, a hollow space is temporarily created in a fluid around the paddle due to high-speed rotation of the paddle, and a vacuum zone or a low-pressure zone is created temporarily. The zone is called cavity part.

Figure 5:
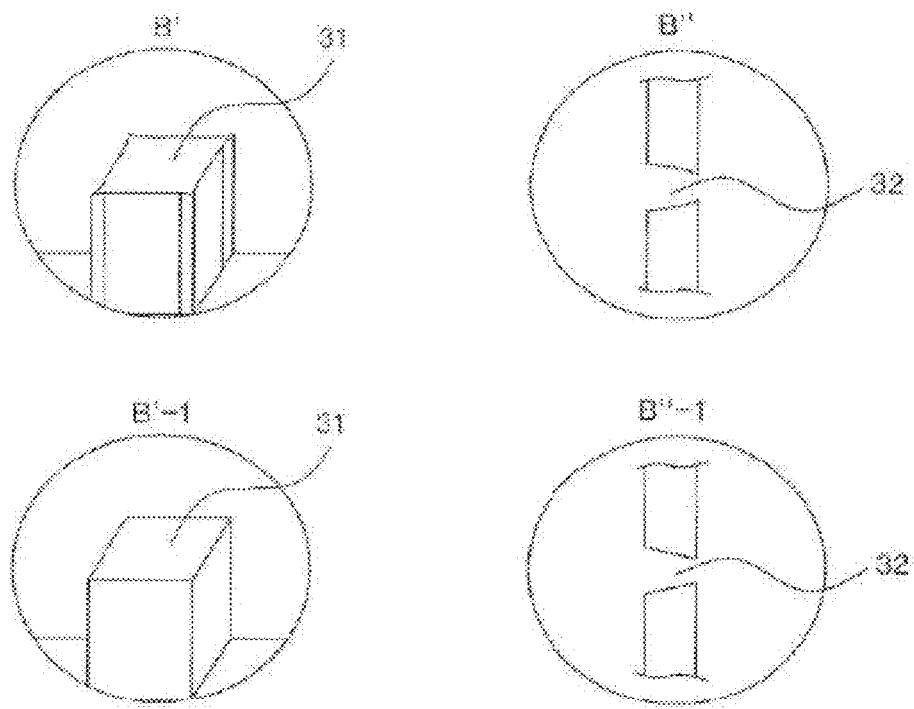
FIG. 5 is enlarged views showing portions B' and B" of FIG. 4.
Figure 6:
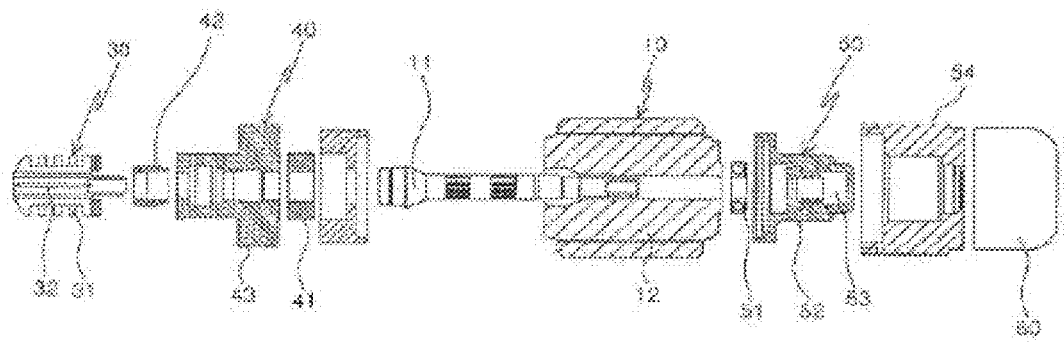
FIG. 6 is an exploded view of the mixing apparatus for crushing sludge according to the present invention.

With reference to FIG. 5, the corner of the discharge hole 32 and the saw-toothed part 31 may be blade-shaped or perpendicular.

The paddle 30 rotates at a velocity between 2,500 revolutions per minute (RPM) and 4,500 RPM.

Here, the paddle 30 may rotate at the velocity between 3,000 RPM and 4,000 RPM.

The present invention is explained in greater detail below.

The motor part 10 includes the main body 11 in which the shaft 11 is coupled and rotates, the first plate 50 coupled with the side of the shaft 11, and the second plate 40 coupled with the another side of the shaft 11.

The paddle is coupled with another side of the second plate 40.

The paddle 30 is connected to the shaft 11, rotates with the shaft 11 when the shaft 11 rotates, and crushes the sludge and forms the flock through the rotation.

When the chemical supplied from the external chemical feeder is fed into the inlet part 53 disposed in the first sealing part 52, the chemical is moved to the another side through the penetrating path disposed in the length direction of the shaft 11. Here, the first bearing part 51 is disposed between the first sealing part 52 and the shaft 11 so that the shaft 11 rotates smoothly.

The chemical moved through the penetrating path of the shaft 11 is discharged out of the discharge hole 32 through the moving hole of the paddle 30 connected to the another side of the shaft 11.

The second sealing part 42 is disposed at a joint between the shaft 11 and the paddle 30 so that the chemical is does not leak out. The second bearing part 41 is disposed between the securing part surrounding and fixing the outer side of the second sealing part 42 and the shaft 11 so that the shaft 11 rotates smoothly.

The chemical discharged out of the discharge hole 32 is mixed with the sludge and the flock is formed while the paddle 30 rotates.

The saw-toothed parts 31 are disposed in the outside direction at the outer circumference of the paddle 30 so that the flock is formed smoothly. The saw-toothed parts 31 crush a microbial cell in the sludge colliding during the rotation so that the moisture contained in the microbial cell is discharged.

Here, the cavitation occurs around the paddle 30 due to the rotation of the paddle 30, and the moisture contained in the crushed microbial cell is squeezed.

According to the present invention, dehydrator efficiency is raised and water content of a dehydration cake is lowered since the microbial cell is destroyed by the corner of the saw-toothed part of the rotating paddle while the cavitation is induced to remove the moisture contained in the microbial cell.

Further, since agitation is conducted by the paddle rotating at a high speed in a narrow pipe, an even and solid flock is made by using a proper amount of the chemical (coagulant) so that the chemical (coagulant) is saved compared to a previous chemical (coagulant) feeding method. Sludge sedimentation and thickening efficiency improves, and overall efficiency of water purification and waste water treatment increases.

While this invention has been particularly shown and described with reference to preferred embodiments thereof, it will be understood by those skilled in the art that various changes in form and details may be made therein without departing from the spirit and scope of the invention as defined by the appended claims. The scope of the invention is defined not by the detailed description of the invention but by the appended claims, and all differences within the scope will be construed as being included in the present invention.

DESCRIPTION OF THE SYMBOLS

10 Motor Part
11 Shaft
12 Main Body
20 Moving Part
30 Paddle
31 Saw-toothed Part
32 Discharge Hole
40 Second Plate
41 Second Bearing Part
42 Second Sealing Part
43 Securing Part
50 First Plate
51 First Bearing Part
52 First Sealing Part
53 Inlet Part
54 Cover Part
60 Cooling Fan

What is claimed is:

1. A mixing apparatus comprising:
a chemical moving part configured to convey a chemical, the chemical moving part including an inlet and a discharge portion, the inlet at a first end portion of the chemical moving part and configured to receive the chemical from an external chemical feeder, the discharge portion at a second end portion of the chemical moving part opposite the first end portion and configured to output the chemical, at locations spaced apart along the second end portion, to a pipe;
a motor configured to rotatably drive a shaft coupled to the motor at a first end of the shaft, the shaft defining a central rotational axis;
a paddle connected to a second end of the shaft and configured to rotate with the shaft, the paddle including at least one projection extending in an outward direction from the central rotational axis of the shaft; and
a plate configured to secure the motor to the pipe, the plate including a first side facing the motor and a second side, opposite the first side, facing the at least one projection of the paddle, the first side defining a first length extending in a direction perpendicular to the shaft and the second side defining a second length extending in a direction perpendicular to the shaft, the first length being greater than the second length.

2. The mixing apparatus of claim 1, wherein the shaft and the paddle are located within the plate.

3. The mixing apparatus of claim 2, wherein the plate defines an opening centrally through the plate, and wherein the shaft and the paddle are located within the opening.

4. The mixing apparatus of claim 1, wherein the plate includes a bearing part between the plate and an outer surface of the shaft.

5. The mixing apparatus of claim 1, wherein the plate includes a sealing part.

6. The mixing apparatus of claim 5, wherein the plate includes a bearing part between the plate and an outer surface of the shaft, and wherein the sealing part is between the bearing part and the plate.

7. The mixing apparatus of claim 1, wherein the plate includes a securing part.

8. The mixing apparatus of claim 7, wherein plate includes a bearing part between the plate and an outer surface of the shaft and a sealing part between the bearing part and the plate, and wherein the securing part is configured to secure each of the bearing part and the sealing part at the plate.

9. The mixing apparatus of claim 1, wherein the paddle terminates in a curved end at a portion of the paddle opposite the shaft, wherein the at least one projection of the paddle terminates in a first outward edge, and wherein the first outward edge is parallel with the central rotational axis of the shaft.

10. The mixing apparatus of claim 9, wherein the at least one projection is integral with the curved end.

11. The mixing apparatus of claim 9, wherein the paddle is configured to extend into the pipe in a direction parallel to the central rotational axis, and wherein the curved end curves toward the first outward edge as the curved end extends in a direction away from the central rotational axis.

12. The mixing apparatus of claim 9, wherein the curved end curves in the outward direction from the central rotational axis as the paddle extends proximally from a distal portion of the paddle, the distal portion of the paddle being the portion at which the paddle terminates.

13. The mixing apparatus of claim 9, wherein the at least one projection extending in the outward direction from the central rotational axis of the shaft and terminating in the outward edge comprises a first projection extending in the outward direction from the central rotational axis of the shaft and terminating in a first outward edge and a second projection extending in the outward direction from the central rotational axis of the shaft and terminating in a second outward edge, each of the first outward edge and the second outward edge being parallel with the central rotational axis of the shaft, wherein each of the first projection and the second projection is integral with the curved end.

14. The mixing apparatus of claim 13, wherein the first projection is spaced along the central rotational axis from the second projection.

15. The mixing apparatus of claim 13, wherein the first projection is aligned with, and spaced along the paddle in a direction perpendicular to the central rotational axis from, the second projection.

16. The mixing apparatus of claim 1, wherein the discharge portion of the chemical moving part is an elongated slot extending in a direction parallel to the central rotational axis.

17. The mixing apparatus of claim 1, wherein the second side of the plate is spaced from a surface of a main body of the motor.

18. The mixing apparatus of claim 1, wherein the first side of the plate is at one end of the plate and the second side of the plate is at another, opposite end of the plate.

19. The mixing apparatus of claim 1, wherein the at least one projection of the paddle is spaced from the discharge portion of the chemical moving part.

20. The mixing apparatus of claim 1, wherein the discharge portion of the chemical moving part is at the paddle.

\* \* \* \* \*